(12) United States Patent
Berger et al.

(10) Patent No.: US 7,638,210 B2
(45) Date of Patent: Dec. 29, 2009

(54) PERPENDICULAR MAGNETIC RECORDING MEDIUM WITH EXCHANGE-COUPLED MAGNETIC LAYERS AND IMPROVED COUPLING LAYER

(75) Inventors: Andreas Klaus Berger, San Jose, CA (US); Xiaoping Bian, Saratoga, CA (US); Mary Frances Minardi, Santa Cruz, CA (US); Kentaro Takano, San Jose, CA (US); Kai Tang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 151 days.

(21) Appl. No.: 11/735,710

(22) Filed: Apr. 16, 2007

(65) Prior Publication Data

US 2008/0254324 A1  Oct. 16, 2008

(51) Int. Cl.
*G11B 5/66* (2006.01)
(52) U.S. Cl. .................. 428/828; 428/828.1; 428/829; 428/212; 360/135
(58) Field of Classification Search ................. None
See application file for complete search history.

(56) References Cited

U.S. PATENT DOCUMENTS

| | | | |
|---|---|---|---|
| 6,007,924 A | 12/1999 | Lal et al. | |
| 6,834,026 B2 | 12/2004 | Fullerton et al. | |
| 7,094,483 B2 | 8/2006 | Pelhos et al. | |
| 2003/0096127 A1 | 5/2003 | Hikosaka et al. | |
| 2004/0166371 A1* | 8/2004 | Berger et al. | 428/694 T |
| 2005/0084715 A1 | 4/2005 | Hee et al. | |
| 2006/0068230 A1 | 3/2006 | Faehler | |
| 2006/0139799 A1 | 6/2006 | Wu et al. | |
| 2006/0177700 A1 | 8/2006 | Fullerton et al. | |
| 2006/0177703 A1* | 8/2006 | Takenoiri et al. | 428/829 |
| 2006/0177704 A1 | 8/2006 | Berger et al. | |
| 2006/0204791 A1* | 9/2006 | Sakawaki et al. | 428/828.1 |
| 2006/0228586 A1* | 10/2006 | Girt et al. | 428/828 |

OTHER PUBLICATIONS

Derwent Abstract Translation of JP 2006-048900 A (Derwent Acc-No. 2006-168815).*
Benakli et al., "Micromagnetic Study of Switching Speed in Perpendicular Recording Media", IEEE Trans. MAG 37, 1564 (2001).

(Continued)

*Primary Examiner*—Kevin M Bernatz
(74) *Attorney, Agent, or Firm*—Thomas R. Berthold (57) ABSTRACT

A perpendicular magnetic recording medium has an "exchange-spring" type magnetic recording layer (RL) with an improved coupling layer (CL). The RL includes the first or lower ferromagnetic layer MAG1, sometimes called the "media" layer, the second or upper ferromagnetic layer MAG2, sometimes called the "exchange-spring" layer, and the intermediate CL that provides ferromagnetic exchange coupling between MAG1 and MAG2. The CL is formed of NiCr or RuCr based alloys, or CoCr or CoCrB alloys with high Cr and/or B content (Cr plus B>about 25 atomic percent), or RuCoCr alloys with low Co content (<about 65 atomic percent). For each CL composition there is a CL thickness range that provides the optimal interlayer exchange coupling between MAG1 and MAG2. The selected CL materials provide an exchange-type perpendicular magnetic recording medium with good magnetic performance, while the relatively high amount of Cr of the CL improves the corrosion resistance of the medium.

15 Claims, 7 Drawing Sheets

OTHER PUBLICATIONS

Gao et al., "Transition Jitter Estimates in Tilted and Conventional Perpendicular Recording Media at 1 Tb/in2", IEEE Trans. MAG 39, 704 (2003).

Victoria et al., "Composite Media for Perpendicular Magnetic Recording", IEEE Trans MAG 41(2), 537-542, Feb. 2005.

Wang et al., "Composite media (dynamic tilted media) for magnetic recording", Appl. Phys. Lett. 86 (14) Art. No. 142504, Apr. 4, 2005.

Choe et al., "Perpendicular Recording CoPtCrO Composite Media With Performance Enhancement Capping Layer", IEEE Transactions on Magnetics, vol. 41, No. 10, Oct. 2005, pp. 3172-3174.

Suess et al., "Optimization of Exchange Spring Perpendicular Recording Media", IEEE Transactions on Magnetics, vol. 41, No. 10, Oct. 2005, pp. 3166-3168.

Sonobe et al., Thermally stable CGC perpendicular recording media with Pt-rich CoPtCr and thin Pt layers, IEEE Transactions on Magnetics, vol. 36, No. 5, Sep. 2002, pp. 2006-2011.

Schuermann, et al., "Exchange-coupling effects in perpendicular composite materials", J.Appl.Phys. 99, 08Q904 2006.

Wang et al., "Exchange Coupled Composite Media for Perpendicular Magnetic Recording", IEEE Transactions on Magnetics, vol. 41, No. 10, Oct. 2005 p. 3181.

Jiang et al., "Indirect exchange spring between FePt and Fe with a Ru interlayer", Journal of Magnetism and Magnetic Materials 302 (2006) 40-46.

* cited by examiner

PERPENDICULAR MAGNETIC RECORDING MEDIUM WITH EXCHANGE-COUPLED MAGNETIC LAYERS AND IMPROVED COUPLING LAYER

BACKGROUND OF THE INVENTION

1. Field of the Invention

This invention relates generally to perpendicular magnetic recording media, and more particularly to a disk with a perpendicular magnetic recording layer for use in magnetic recording hard disk drives.

2. Description of the Related Art

Figure 1:
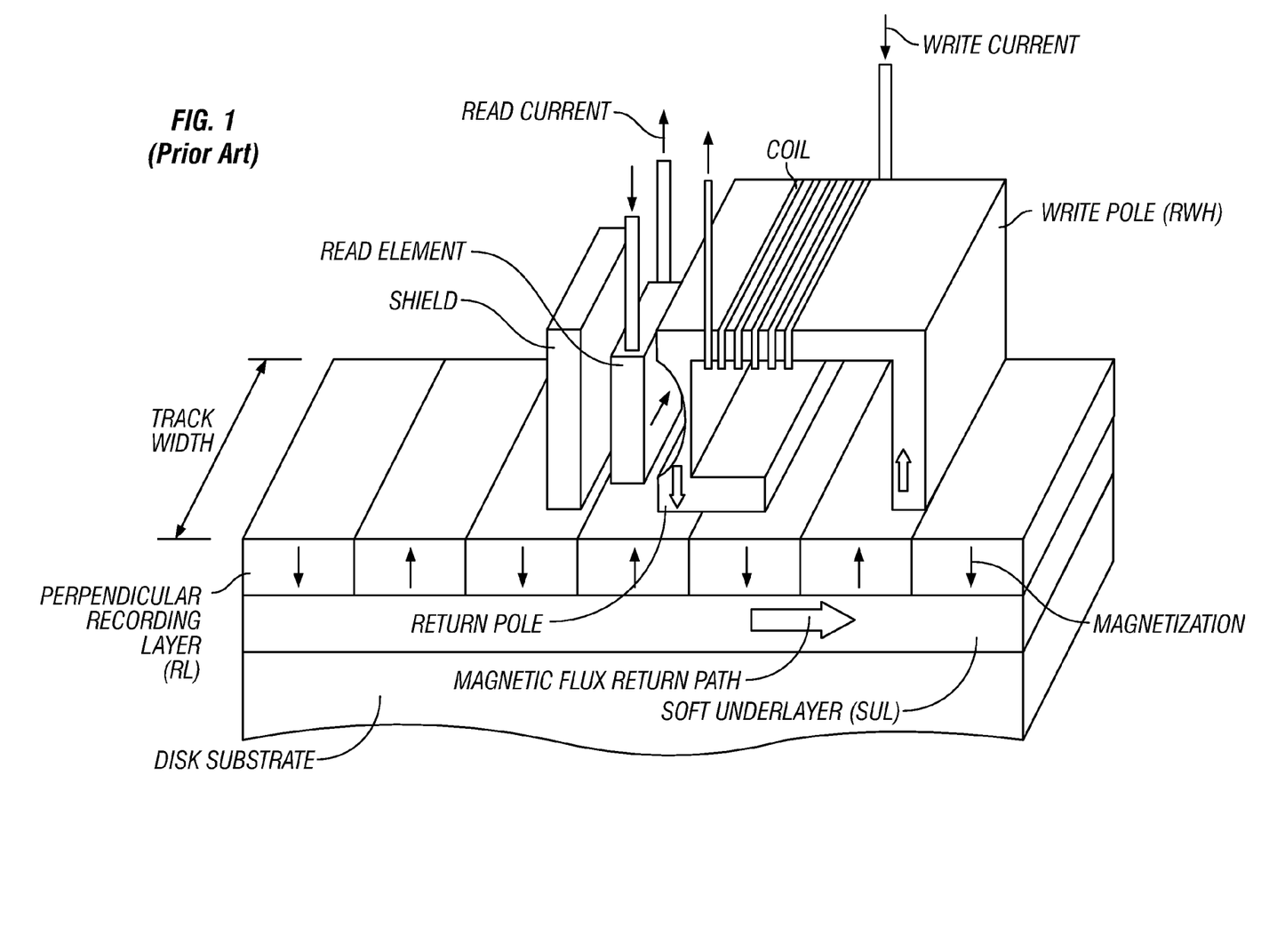
FIG. 1 is a schematic of a prior art perpendicular magnetic recording system.

Perpendicular magnetic recording, wherein the recorded bits are stored in the generally planar recording layer in a generally perpendicular or out-of-plane orientation (i.e., other than parallel to the surfaces of the disk substrate and the recording layer), is a promising path toward ultra-high recording densities in magnetic recording hard disk drives. A common type of perpendicular magnetic recording system is one that uses a "dual-layer" medium. This type of system is shown in FIG. 1 with a single write pole type of recording head. The dual-layer medium includes a perpendicular magnetic data recording layer (RL) on a "soft" or relatively low-coercivity magnetically permeable underlayer (SUL) formed on the substrate.

One type of material for the RL is a granular ferromagnetic cobalt alloy, such as a CoPtCr alloy, with a hexagonal-close-packed (hcp) crystalline structure having the c-axis oriented generally perpendicular or to the RL. The granular cobalt alloy RL should also have a well-isolated fine-grain structure to produce a high-coercivity media and to reduce intergranular exchange coupling, which is responsible for high intrinsic media noise. Enhancement of grain segregation in the cobalt alloy RL can be achieved by the addition of oxides, including oxides of Si, Ta, Ti, Nb, Cr, V, and B. These oxides tend to precipitate to the grain boundaries, and together with the elements of the cobalt alloy form nonmagnetic intergranular material.

The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

Figure 2:
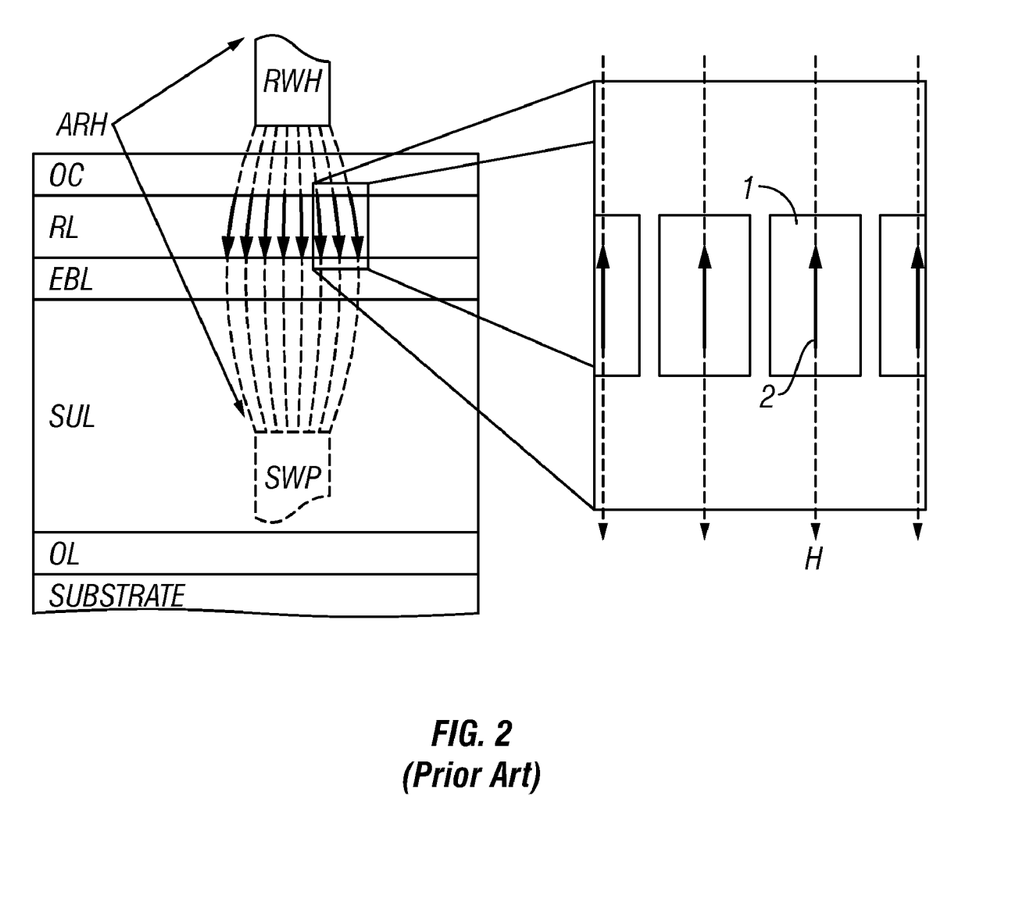
FIG. 2 is a schematic of a cross-section of a prior art perpendicular magnetic recording disk showing the write field H acting on the recording layer (RL).

FIG. 2 is a schematic of a cross-section of a prior art perpendicular magnetic recording disk showing the write field H acting on the recording layer RL. The disk also includes the hard disk substrate that provides a generally planar surface for the subsequently deposited layers. The generally planar layers formed on the surface of the substrate also include a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC). As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and a secondary write pole (SWP) beneath the RL. The SWP is facilitated by the SUL, which is decoupled from the RL by the EBL and produces a magnetic mirror image of the RWH during the write process. This effectively brings the RL into the gap of the ARH and allows for a large write field H inside the RL. However, this geometry also results in the write field H inside the RL being oriented nearly normal to the surface of the substrate and the surface of the RL, i.e., along the perpendicular easy axis of the RL grains, as shown by typical grain 1 with easy axis 2. The nearly parallel alignment of the write field H and the RL easy axis has the disadvantage that relatively high write fields are necessary to reverse the magnetization because minimal torque is exerted onto the grain magnetization. Also, a write-field/easy-axis alignment increases the magnetization reversal time of the RL grains, as described by M. Benakli et al., *IEEE Trans. MAG* 37, 1564 (2001).

For these reasons, "tilted" media have been theoretically proposed, as described by K.-Z. Gao et al., *IEEE Trans. MAG* 39, 704 (2003), in which the magnetic easy axis of the RL is tilted at an angle of about 45 degrees with respect to the surface normal, so that magnetization reversal can be accomplished with a lower write field and without an increase in the reversal time. While there is no known fabrication process to make high-quality recording media with a tilted easy axis, there have been proposals to achieve a magnetic behavior that emulates tilted media using a media structure compatible with conventional media fabrication techniques. In one technique, the perpendicular recording medium is a composite medium of two ferromagnetically exchange-coupled magnetic layers with substantially different anisotropy fields ($H_k$). (The anisotropy field $H_k$ of a ferromagnetic layer with uniaxial magnetic anisotropy $K_u$ is the magnetic field that would need to be applied along the easy axis to switch the magnetization direction.) Magnetic simulation of this composite medium shows that in the presence of a uniform write field H the magnetization of the lower-$H_k$ layer will rotate first and assist in the reversal of the magnetization of the higher-$H_k$ layer. This behavior, sometimes called the "exchange-spring" behavior, and various types of composite media are described by R. H. Victora et al., "Composite Media for Perpendicular Magnetic Recording", *IEEE Trans MAG* 41 (2), 537-542, February 2005; and J. P. Wang et al., "Composite media (dynamic tilted media) for magnetic recording", *Appl. Phys. Lett.* 86 (14) Art. No. 142504, Apr. 4, 2005.

Pending application Ser. No. 11/231,516, published as US2006/0177704A1 on Aug. 10, 2006 and assigned to the same assignee as this application, describes an exchange-spring perpendicular magnetic recording medium with two magnetic layers with substantially different anisotropy fields coupled together by a CoRu or CoCr coupling layer. The Ser. No. 11/231,516 application is a continuation-in-part of pending application Ser. No. 11/051,536, published as US2006/0177700A1 on Aug. 10, 2006, which describes a horizontal magnetic recording medium with a high-moment upper magnetic layer exchange-coupled to a high-$H_k$ lower magnetic layer by a coupling layer of CoRu (Ru between 25 and 70 atomic percent) or CoCr (Cr between 26 and 40 atomic percent). Pending application Ser. No. 11/372,295, filed Mar. 9, 2006 and assigned to the same assignee as this application, describes an exchange-spring perpendicular magnetic recording medium with two magnetic layers with substantially the same anisotropy fields coupled together by a coupling layer formed of RuCo or RuCoCr alloys with low Co content (<about 60 atomic percent), or CoCr or CoCrB alloys with high Cr and/or B content (Cr plus B>about 30 atomic percent).

What is needed is an exchange-spring type of perpendicular magnetic recording medium with an improved coupling layer that results in a medium with optimal exchange coupling and magnetic performance as well as good corrosion resistance.

SUMMARY OF THE INVENTION

The invention is a perpendicular magnetic recording medium having an "exchange-spring" type magnetic recording layer (RL) with an improved coupling layer (CL). The RL includes the first or lower ferromagnetic layer MAG1, sometimes called the "media" layer, the second or upper ferromagnetic layer MAG2, sometimes called the "exchange-spring" layer, and the intermediate CL that provides ferromagnetic exchange coupling between MAG1 and MAG2. The CL is below MAG2 and sustains the growth of MAG2 while mediating an optimized level of ferromagnetic coupling between MAG2 and MAG1, that is not too strong to enable incoherent reversal and not too weak to allow for a substantial write assist effect. The CL is formed of NiCr or RuCr based alloys, or CoCr or CoCrB alloys with high Cr and/or B content (Cr plus B>about 25 atomic percent), RuCoCr alloys with sufficiently low Co content (<about 65 atomic percent), or RuCo alloys with sufficiently low Co content (<about 70 atomic percent). For each CL composition there is a CL thickness range that provides the optimal interlayer exchange coupling between MAG1 and MAG2. The selected CL materials provide an exchange-type perpendicular magnetic recording medium with good magnetic performance, while the relatively high amount of Cr of the CL improves the corrosion resistance of the medium.

For a fuller understanding of the nature and advantages of the present invention, reference should be made to the following detailed description taken together with the accompanying figures.

DETAILED DESCRIPTION OF THE INVENTION

Figure 3A:
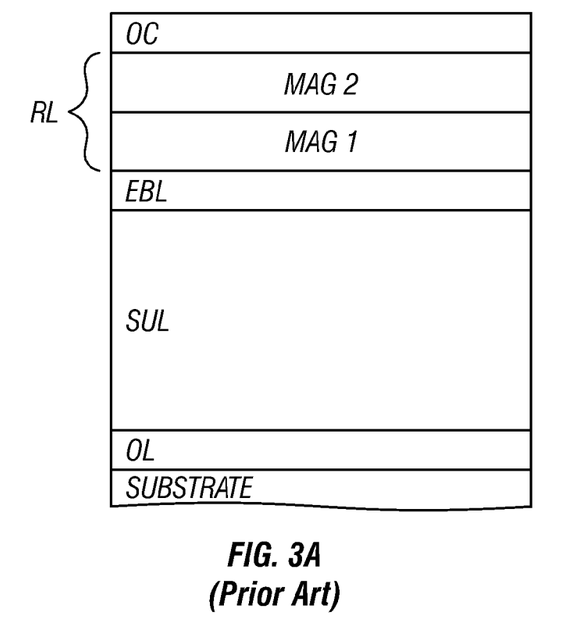
FIG. 3A is a schematic of a cross-section of a prior art perpendicular magnetic recording disk with an exchange-spring recording layer (RL) made up of two ferromagnetically exchange-coupled magnetic layers (MAG1 and MAG2).

FIG. 3A is a schematic of a cross-section of a perpendicular magnetic recording disk according to the prior art with an exchange-spring recording layer (RL) made up of two ferromagnetically exchange-coupled magnetic layers (MAG1 and MAG2). MAG1, sometimes called the exchange-spring layer, and MAG2, sometimes called the media layer, each has perpendicular magnetic anisotropy. However, MAG1 and MAG2 have different magnetic properties, so that they respond differently to the applied write field. For example, one of MAG1 and MAG2 can be magnetically soft and the other magnetically hard. With a proper interlayer exchange coupling between the grains in MAG1 and MAG2, the soft grains will rotate first under the applied write field, while at the same time providing an exchange field to the hard grains to effectively tilt their easy axis, thus assisting in the magnetization reversal of the grains in the hard layer. In the prior art disk of FIG. 3A the two magnetic layers MAG1 and MAG2 are in contact and are directly exchange-coupled without an intermediate coupling layer.

Figure 3B:
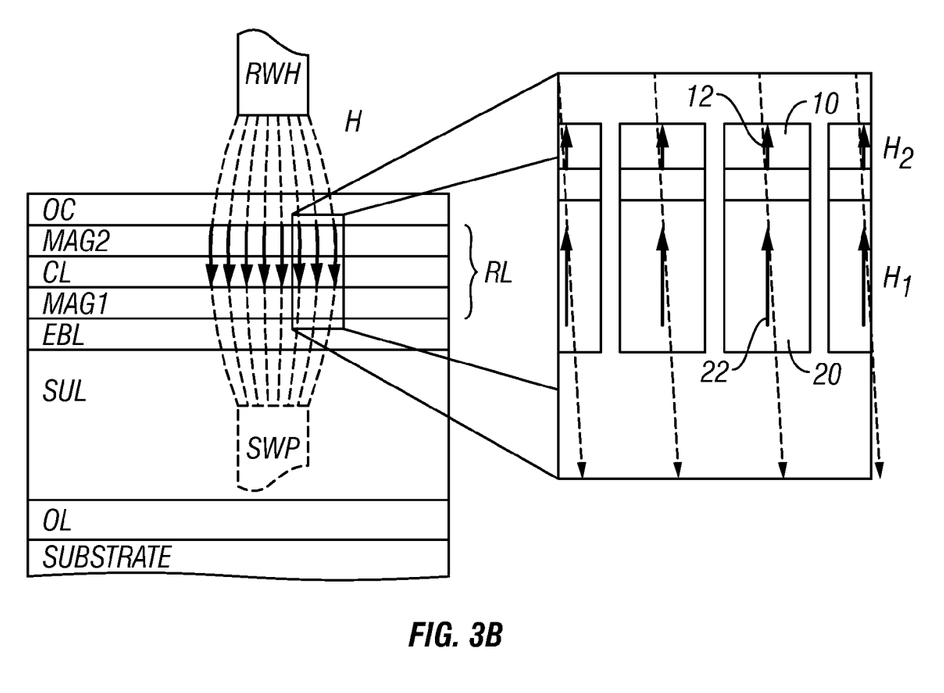
FIG. 3B is a schematic of a cross-section of a perpendicular magnetic recording disk with an exchange-spring recording layer (RL) made up of two magnetic layers (MAG1 and MAG2) separated by a ferromagnetic coupling layer (CL), and the fields H1 and H2 acting on MAG1 and MAG2, respectively.

FIG. 3B illustrates an exchange-spring medium like that described in the previously-cited pending application Ser. Nos. 11/231,516 and 11/372,295 wherein a coupling layer (CL) is located between MAG1 and MAG2. The composite RL has at least two ferromagnetically exchange-coupled magnetic layers (MAG1 and MAG2), each with generally perpendicular magnetic anisotropy, that are separated by the CL. The CL provides the appropriate ferromagnetic coupling strength between the magnetic layers. As shown in the expanded portion of FIG. 3B, a typical grain 10 in MAG2 has a generally perpendicular or out-of-plane magnetization along an easy axis 12, and is acted upon by a write field H2. A typical grain 20 in MAG1 below the MAG2 grain 10 also has a perpendicular magnetization along an easy axis 22, and is acted upon by a write field H1 that is less than H2 as a result of MAG1 being farther from the write head than MAG2. In the presence of the applied write field H2, the MAG2 acts as a write assist layer by exerting a magnetic torque onto MAG1 that assists in reversing the magnetization of MAG1. In this non-coherent reversal of the magnetizations of MAG1 and MAG2, MAG2 changes its magnetization orientation in response to a write field and in turn amplifies the "torque," or reverse field, exerted on MAG1, causing MAG1 to change its magnetization direction in response to a weaker write field.

As described in pending application Ser. No. 11/231,516, MAG2 would have a lower $H_k$ than MAG1 and would rotate first and assist in the reversal of the magnetization of the higher-$H_k$ MAG1. As described in pending application Ser. No. 11/372,295, the write field acting on MAG1 can be significantly less than the write field acting on MAG2 in a realistic write head structure, so that non-coherent reversal can be achieved even though MAG1 can have substantially the same $H_k$ as MAG2, resulting in overall improved writability due to the torque created by the magnetization reversal of MAG2.

This invention is a perpendicular magnetic recording medium substantially as described with respect to FIG. 3B, but wherein the coupling layer CL has an improved composition range and thickness range to provide proper magnetic performance as well as improved corrosion resistance.

A representative disk structure for the invention will now be described. The hard disk substrate may be any commercially available glass substrate, but may also be a conventional aluminum alloy with a NiP surface coating, or an alternative substrate, such as silicon, canasite or silicon-carbide.

The adhesion layer or OL for the growth of the SUL may be an AlTi alloy or a similar material with a thickness of about 2-8 nm. The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof.

The EBL is located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer may be used on top of the SUL before deposition of the EBL. For example, if Ru is used as the EBL, a 2-8 nm thick NiFe or NiW seed layer may be deposited on top of the SUL, followed by a 5-30 nm thick Ru EBL. Further, the EBL may include multiple layers.

The MAG1 and MAG2 layers may be formed of any of the known amorphous or crystalline materials and structures that exhibit perpendicular magnetic anisotropy. Thus, the MAG1 and MAG2 may each be a layer of granular polycrystalline cobalt alloy, such as a CoPt or CoPtCr alloy, with a suitable segregant such as oxides of Si, Ta, Ti, Nb, Cr, V and B. Also, MAG1 and MAG2 may each be composed of multilayers with perpendicular magnetic anisotropy, such as Co/Pt, Co/Pd, Fe/Pt and Fe/Pd multilayers, which may or may not contain a suitable segregant such as the materials mentioned above. In addition, perpendicular magnetic layers containing rare earth elements are useable for MAG1 and MAG2, such as CoSm, TbFe, TbFeCo, GdFe alloys. MAG1 and MAG2 may have substantially different magnetic properties, such as different anisotropy fields ($H_k$), to assure that they respond differently to the applied write field and thereby exhibit the exchange-spring behavior to improve writability. MAG1 and MAG2 may also have substantially the same anisotropy field $H_k$, meaning that the $H_k$ value for the layer with the lower $H_k$ is at least 70% (and up to at least 90%) of the $H_k$ value for the layer with the higher $H_k$, and still exhibit the exchange-spring behavior as described above for the medium shown in FIG. 3B.

The MAG2 layer may be in particular an alloy including Co, Cr, Pt, and B. The range for the elements in the MAG2 layer is as follows: Cr between about 10 to 16 atomic percent (at. %), Pt between about 15 to 21 at. %, and B between about 4 to 11 at. %, with the balance of the composition of the MAG2 layer being Co. The preferred range for the elements in the MAG2 layer is as follows: $11 \leq Cr \leq 15$ at. %, $16 \leq Pt \leq 20$ at. %, and $5 \leq B \leq 10$ at. % with the balance of the composition of the MAG2 layer being Co. Other elements such as Cu and Ta may additionally be added to the alloy in amounts less than 10 at. % and more preferably less than 4 at. %.

The advantage of a MAG2 layer of a CoCrPtB alloy is to improve the corrosion resistance and the mechanical performance of the media while maintaining good recording qualities. The smoothness of the CoCrPtB layer tends to improve the corrosion resistance of the media.

The OC formed on top of the RL may be an amorphous "diamond-like" carbon film or other known protective overcoats, such as Si-nitride.

Because the CL is below MAG2, it should be able to sustain the growth of MAG2, while mediating a ferromagnetic coupling of appropriate strength between the MAG2 and MAG1. Hexagonal-close-packed (hcp) materials can mediate a sufficiently weak ferromagnetic coupling and provide a good template for the growth of MAG2. Face-centered-cubic (fcc) materials enable a ferromagnetic coupling between magnetic layers of tunable strength (i.e., they reduce the coupling by increasing the thickness) and are compatible with growth of MAG2. Because the CL must enable an appropriate coupling strength, it should be either nonmagnetic or weakly ferromagnetic. In this invention, the CL may be formed of NiCr or RuCr based alloys, or CoCr or CoCrB alloys with sufficiently high Cr and/or B content (Cr+B>about 25 atomic percent), or RuCoCr alloys with sufficiently low Co content (<about 65 atomic percent).

To achieve higher corrosion resistance, several CL materials with a considerable amount of Cr were tested and found to produce excellent recording properties, as demonstrated by FIGS. 4-7. Also, from a growth point of view, these CL materials have either hcp or fcc crystalline structures and preferably small lattice mismatch with the adjacent CoPtCr alloy (with or without an oxide) media layer (MAG1) and exchange-spring layer (MAG2), so that the RL structure represents a MAG1/CL/MAG2 growth sequence.

Figure 4A:
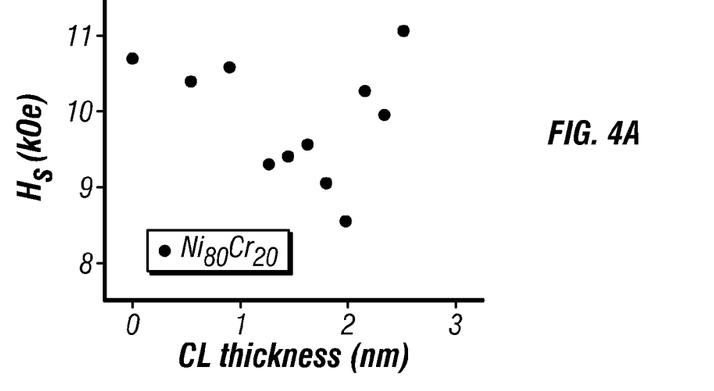
FIGS. 4A-4C are graphs of saturation field Hs as a function of CL thickness for three tested CL materials, specifically $Ni_{80}Cr_{20}$, $Co_{66}Cr_{34}$ and $Co_{63}Cr_{37}$.
Figure 4B:
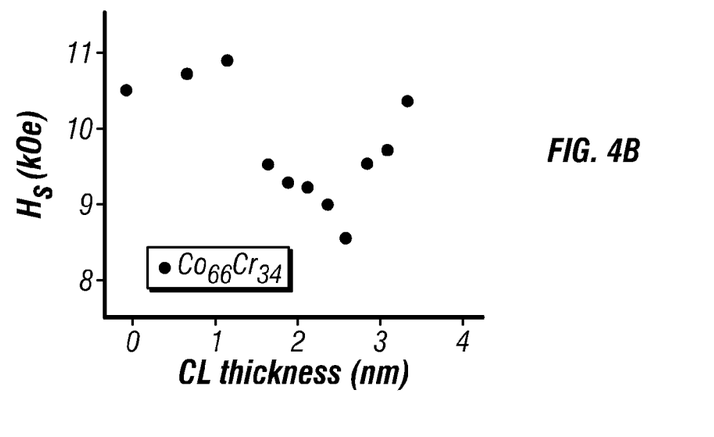
Figure 4C:
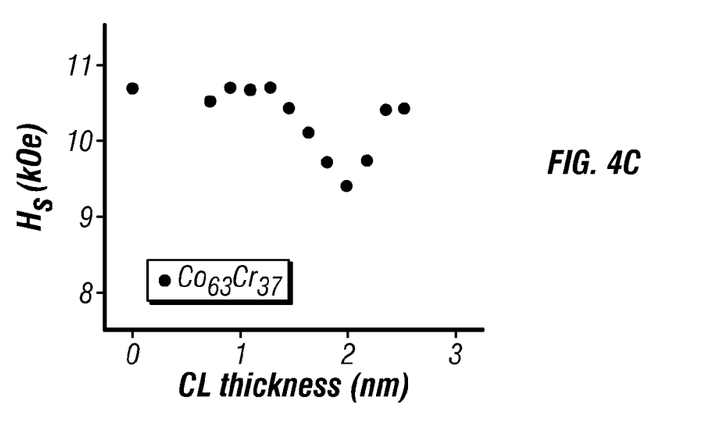
Figure 5A:
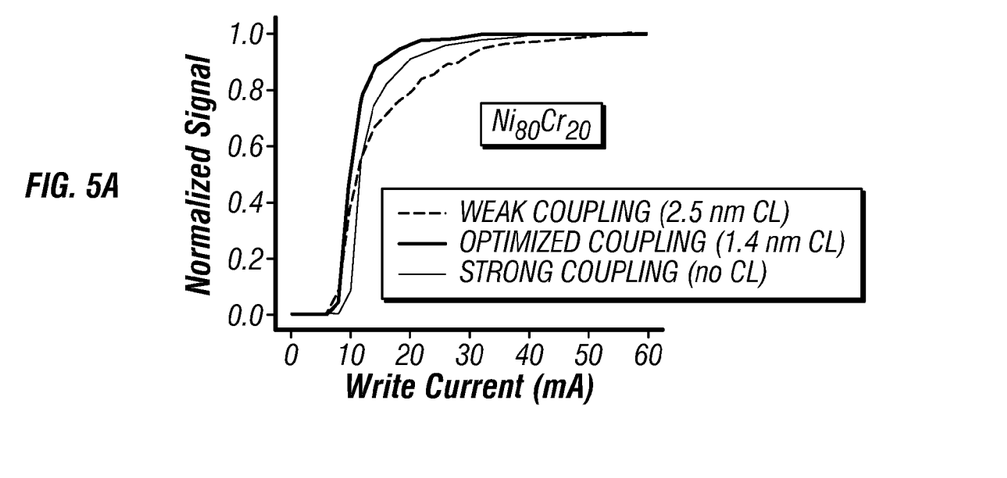
FIGS. 5A-5C are signal saturation curves for the three tested CL materials of $Ni_{80}Cr_{20}$, $Co_{66}Cr_{34}$ and $Co_{63}Cr_{37}$.
Figure 5B:
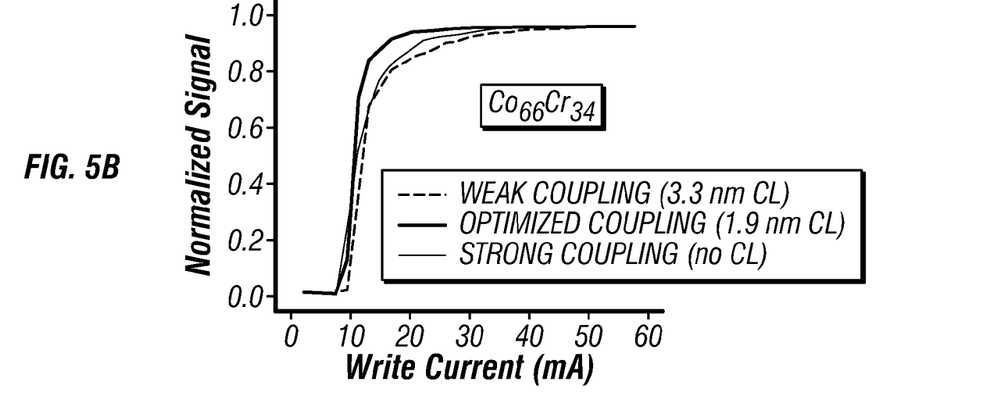
Figure 5C:
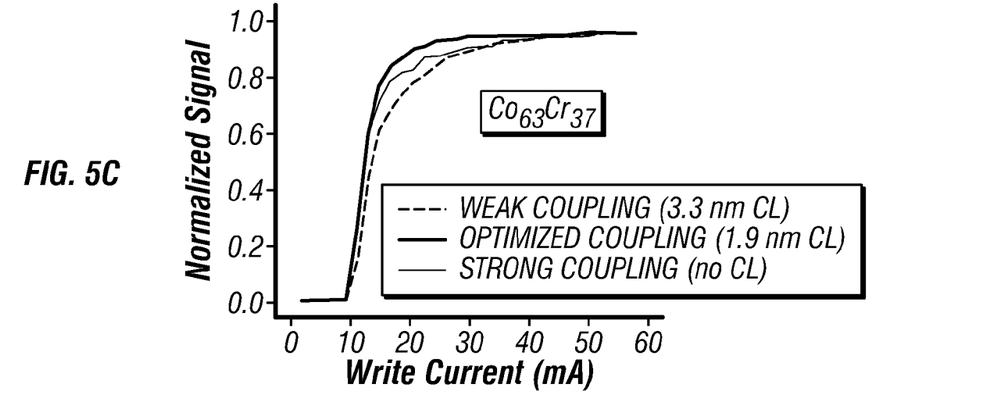

FIGS. 4A-4C are graphs of saturation field Hs as a function of CL thickness for three tested CL materials ($Ni_{80}Cr_{20}$; $Co_{66}Cr_{34}$; and $Co_{63}Cr_{37}$). The media structures (SUL/EBL/ 12 nm Ta-oxide-containing MAG1/CL/4 nm Si-oxide-containing MAG2) show a pronounced minimum of the saturation field Hs at an intermediate CL thickness (different for different CL materials) caused by the non-uniform magnetization reversal process that is facilitated by the optimal interlayer coupling. This fact is equally reflected in FIGS. 5A-5C, which are signal saturation curves for the three tested CL materials and which demonstrate that a CL of optimal thickness improves the media writability substantially, as compared to both fully-coupled structures (no CL) and very weakly-coupled structures.

Figure 6A:
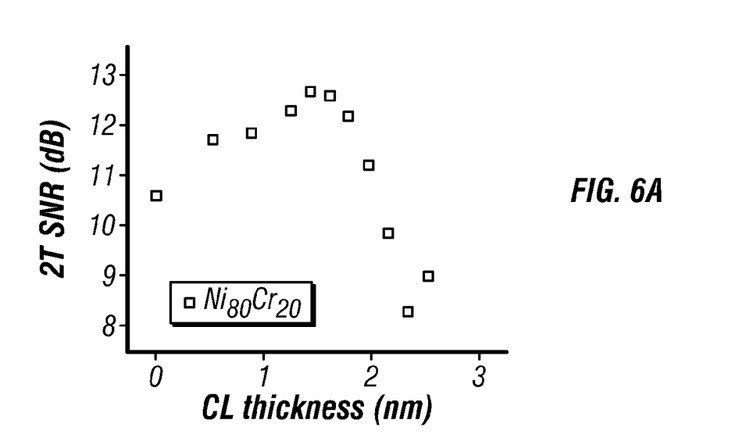
FIGS. 6A-6C are graphs of signal-to-noise ratio (SNR) in units of 2T SNR as a function of CL thickness for the three tested CL materials of $Ni_{80}Cr_{20}$, $Co_{66}Cr_{34}$ and $Co_{63}Cr_{37}$.
Figure 6B:
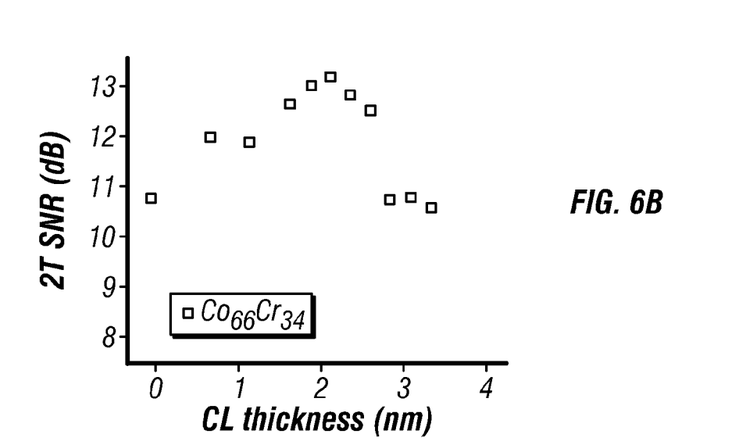
Figure 6C:
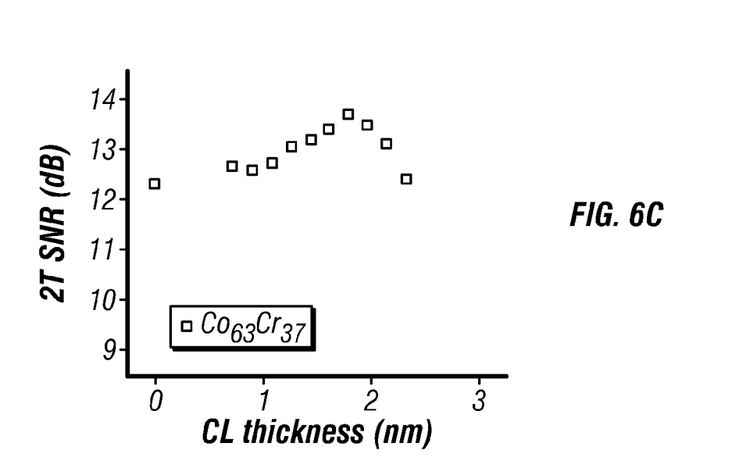
Figure 7A:
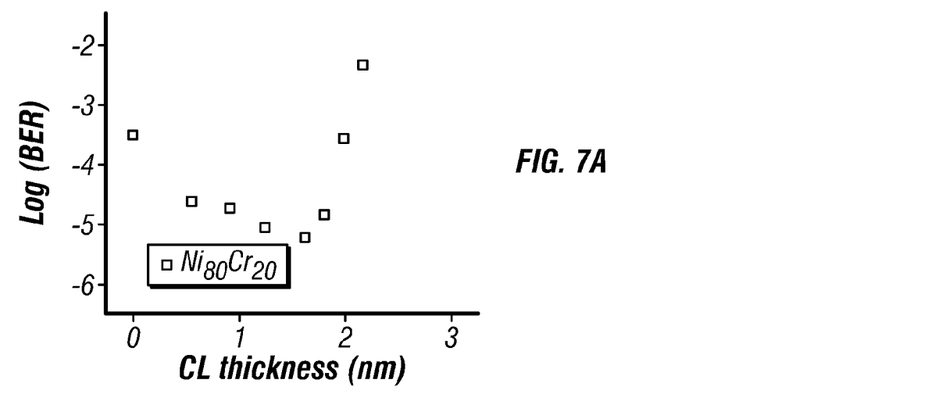
FIGS. 7A-7C are graphs of the bit error rate (BER) (logarithmic) as a function of CL thickness for the three tested CL materials of $Ni_{80}Cr_{20}$, $Co_{66}Cr_{34}$ and $Co_{63}Cr_{37}$.
Figure 7B:
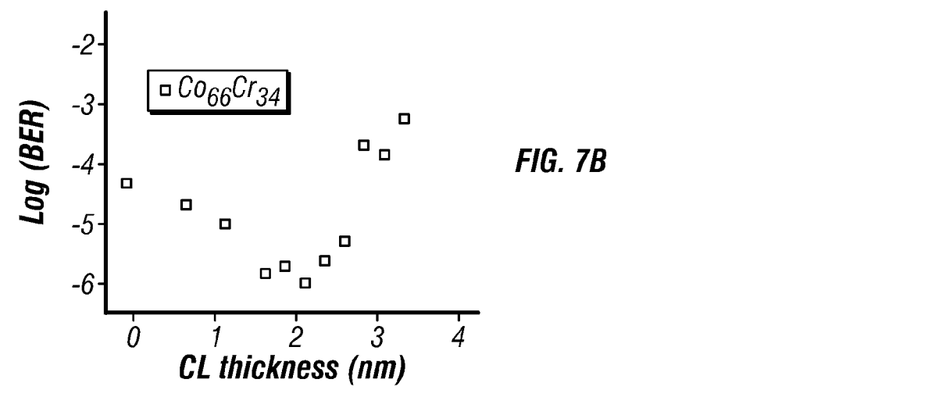
Figure 7C:
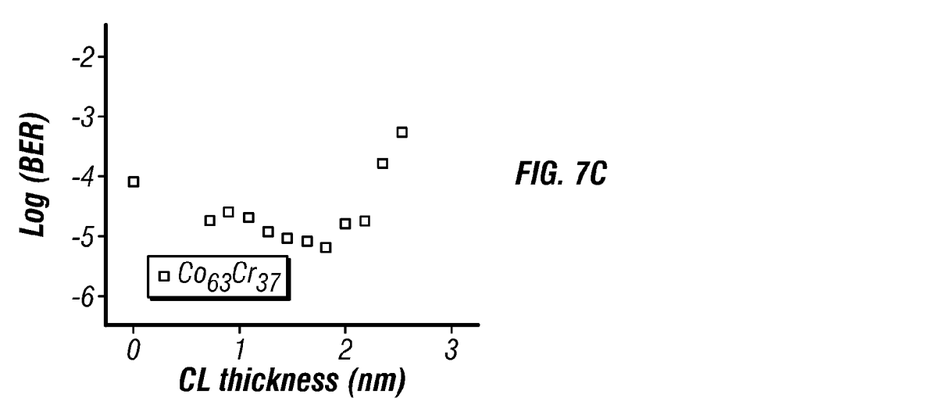

FIGS. 6A-6C are graphs of signal-to-noise ratio (SNR) in units of 2T SNR as a function of CL thickness for the three tested CL materials. 2T SNR is the ratio of the signal to the media noise at half the target density (which was 1060 thousand flux changes/per inch (kfci) for these measurements). The improved SNR for the optimal CL thicknesses is due to a narrower switching field distribution. FIGS. 7A-7C are graphs of the bit error rate (BER) (logarithmic) as a function of CL thickness for the three tested CL materials and show the improved BER at the optimal CL thicknesses.

In addition to the specifically tested NiCr material, additional CL materials include an alloy consisting essentially of only Ni and Cr (with Cr greater than about 8 atomic percent), NiCr-based alloys that may include one or more elements (e.g., Fe, Co, or W), an alloy consisting essentially of only Ru and Cr (with Cr greater than about 20 atomic percent), and RuCr-based alloys that may include one or more elements (e.g., Ni, Re, or W). In addition to the specifically tested CoCr materials, additional CL materials include an alloy consisting essentially of only Co and Cr (with Cr greater than about 25 atomic percent), and an alloy consisting essentially of only Co, Cr and B (with Cr plus B greater than about 25 atomic percent).

The CL material may also be a RuCoCr alloy with low Co content (<about 65 atomic percent). In another tested RL structure, the CL was nonmagnetic $Ru_{50}Co_{30}Cr_{20}$, MAG1 was a 13 nm thick $Co_{57}Pt_{18}Cr_{17}(SiO_2)_8$ layer, and MAG2 was a 3 nm thick $Co_{57}Pt_{18}Cr_{17}(SiO_2)_8$ layer. This structure exhibited optimal SNR with CL thickness in the range of about 0.4 to 0.7 nm.

Depending on the choice of material for CL, the CL may have a thickness of less than about 4 nm, and more preferably between about 0.3 nm and 2.5 nm. As shown by the data in FIGS. 4-7, the optimal thickness range for each of the three tested CL materials is approximately 1.2 to 1.7 nm for $Ni_{80}Cr_{20}$, 1.5 to 2.2 nm for $Co_{66}Cr_{34}$, and 1.2 to 1.8 nm for $Co_{63}Cr_{37}$. The inter-layer exchange coupling between MAG1 and MAG2 may be optimized, in part, by adjusting the materials and thickness of the CL. The CL should provide a coupling strength sufficient to have a considerable effect on the switching field (and the switching field distribution), but small enough to not couple the MAG1 and MAG2 layers rigidly together. Also, the appropriate CL thickness will depend on the specific MAG1 and MAG2 material used, and could be substantially different from the specific numbers shown here, while staying within the overall preferred thickness range of 0.3 nm to 2.5 nm.

While the invention has been shown and described with an RL having only two magnetic layers and one CL, the RL may have three or more magnetic layers, with additional CLs as required to mediate an appropriate level of exchange coupling between adjacent magnetic layers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording medium comprising:
   a substrate; and
   an exchange-spring structure on the substrate comprising
      a first ferromagnetic layer on the substrate and having an out-of-plane easy axis of magnetization;
      a second ferromagnetic layer on the first ferromagnetic layer having an out-of-plane easy axis of magnetization; and
      a coupling layer between the first layer and the second layer and permitting ferromagnetic coupling of the first layer with the second layer, the coupling layer being formed of a nonmagnetic alloy consisting essentially of only Ni and Cr, wherein Cr is present in an amount greater than or equal to 8 atomic percent and less than or equal to 20 atomic percent, the coupling layer having a thickness greater than or equal to 1.2 nm and less than or equal to 1.7 nm.

2. The medium of claim 1 wherein each of the first and second ferromagnetic layers has an anisotropy field and wherein the anisotropy field of one of said first and second layers is at least 70% of the anisotropy field of the other of said first and second layers.

3. The medium of claim 1 wherein at least one of the first and second layers is a granular polycrystalline cobalt alloy.

4. The medium of claim 3 wherein said at least one of the first and second layers further comprises an oxide of one or more of Si, Ta, Ti, Nb, Cr, V and B.

5. The medium of claim 1 wherein each of the first and second layers is a multilayer selected from the group consisting of Co/Pt, Co/Pd, Fe/Pt and Fe/Pd multilayers.

6. The medium of claim 1 wherein the coupling layer is a first coupling layer and further comprising a third ferromagnetic layer and a second coupling layer between the second layer and the third layer permitting ferromagnetic coupling of the third layer with the second layer, the second coupling layer having the same composition as said first coupling layer.

7. The medium of claim 1 wherein the second ferromagnetic layer is an alloy including Co, Pt, Cr and B.

8. The medium of claim 7 wherein the first ferromagnetic layer further comprises an oxide of one or more of Si, Ta, Ti, Nb, Cr, V and B.

9. The medium of claim 7 wherein the second ferromagnetic layer includes Cr in amount between about 10 and 16 atomic percent, Pt in an amount between about 15 and 21 atomic percent, and B in an amount between about 4 and 11 atomic percent.

10. The medium of claim 9 wherein the first ferromagnetic layer further comprises an oxide of one or more of Si, Ta, Ti, Nb, Cr, V and B.

11. A perpendicular magnetic recording disk comprising:
   a substrate having a generally planar surface;
   an underlayer of magnetically permeable material on the substrate surface; and
   an exchange-spring structure on the underlayer and comprising
      a first ferromagnetic layer of granular polycrystalline CoPtCr alloy and an oxide of Si on the underlayer and having an out-of plane easy axis of magnetization;
      a second ferromagnetic layer of granular polycrystalline CoPtCr alloy and an oxide of Si having an out-of-plane easy axis of magnetization, the second layer having the same composition as the first layer; and
      a coupling layer between the first layer and the second layer and permitting ferromagnetic coupling of the first layer with the second layer, the coupling layer being formed of a nonmagnetic alloy having a thickness greater than or equal to 1.2 nm and less than or equal to 1.8 nm and consisting essentially of only Co and Cr, wherein Cr is present in an amount greater than or equal to 34 atomic percent and less than or equal to 37 atomic percent.

12. The disk of claim 11 wherein each of the first and second ferromagnetic layers has an anisotropy field and wherein the anisotropy field of one of said first and second layers is at least 70% of the anisotropy field of the other of said first and second layers.

13. The disk of claim 11 wherein at least one of the first and second ferromagnetic layers further comprises an oxide of one or more of Ta, Ti, Nb, Cr, V and B.

14. The disk of claim 11 further comprising an exchange break layer between the underlayer and the first layer for preventing magnetic exchange coupling between the underlayer and the first layer.

15. A perpendicular magnetic recording system comprising: the medium of claim 1;
   a write head for magnetizing regions in the ferromagnetically coupled first and second ferromagnetic layers of said medium, the write head simultaneously applying a magnetic field to the second ferromagnetic layer and a lesser magnetic field to the first ferromagnetic layer so as to magnetize regions in the second ferromagnetic layer prior to magnetizing regions in the first ferromagnetic layer; and
   a read head for detecting the transitions between said magnetized regions.

* * * * *